United States Patent Office 3,553,271
Patented Jan. 5, 1971

3,553,271
PROCESS FOR THE PREPARATION OF PHENOLIC COMPOUNDS
Noël Crenne and Jean-Claude Brunie, Lyon, France, assignors to Rhone-Poulenc S.A., Paris, France, a French body corporate
No Drawing. Original application Apr. 18, 1966, Ser. No. 543,016. Divided and this application Aug. 26 1968, Ser. No. 772,882
Int. Cl. C07c *39/02, 43/20*
U.S. Cl. 260—613                                    2 Claims

ABSTRACT OF THE DISCLOSURE

Process for the preparation of organoperoxy-boranes and using said boranes to oxidize aromatic compounds to the corresponding phenolic compounds.

---

This is a division of application Ser. No. 543,016, filed Apr. 18, 1966.

The present invention relates to a new process for the preparation of organic peresters of orthoboric acid, more specifically to tri(organoperoxy)boranes.

It is well known that trialkylboranes can be oxidised by oxygen and that this oxidation process only affects one or two-thirds of the boron-carbon bonds of the trialkylborane, thus producing borinic or boronic peresters, i.e. mono(alkylperoxy)dialkylboranes or di(alkylperoxy)alkylboranes. Tri(butylperoxy)boranes have been prepared by reacting boron trichloride with the corresponding butyl hydroperoxide (Davies and Moodie, J. Chem. Soc., 2372 (1958)). The same authors tried to react propyl orthoborate with an excess of various hydroperoxides but failed to prepare the corresponding tri(organoperoxy) boranes.

A new method has now been found for obtaining tri(organoperoxy)boranes. Accordingly, the present invention relates to a process for the preparation of tri(organoperoxy)boranes of the formula:

$$B(O-O-R)_3$$

in which R is a primary, secondary or tertiary aliphatic or alicyclic radical of at least four carbon atoms or an araliphatic radical which comprises reacting three moles of one or more organic hydroperoxides of the formula:

$$R-O-O-H$$

in which R is as hereinbefore defined, with at least one mole of one or more alkyl orthoborates of the formula:

$$B(OR')_3$$

in which R' is an alkyl radical, at a temperature not above 90° C. The alkyl orthoborate may be used in excess and/or diluted with an inert solvent; the alcohol liberated by the reaction is preferably removed at the rate at which it is formed. In this specification and accompanying claims the word "solvent" is used to denote any liquid organic product other than alkyl orthoborate which is inert under the reaction conditions.

The new process, which resembles a transesterification, may be represented generally by the reaction scheme

The hydroperoxides which may be used in the process are organic compounds of Formula 1 in which R is a primary, secondary or tertiary aliphatic or alicyclic radical containing at least 4 carbon atoms, or an araliphatic radical. More especially, R represents an alkyl or alkenyl radical of at least 4 carbon atoms; an unsubstituted or lower alkyl (1 to 4 carbon atoms) substituted cycloalkyl or cycloalkenyl radical having 5 to 12 ring carbon atoms; an aralkyl radical, especially phenylalkyl; or a saturated or aromatic bicyclic radical. Most especially, R represents a butyl, pentyl, hexyl, octyl, dodecyl, cyclohexyl, methylcyclohexyl, ethylcyclohexyl, cyclohexenyl, benzyl, phenylethyl, cumyl, p-nitrocumyl, tetrahydronaphthyl, methyltetrahydronaphthyl, decahydronaphthyl, indanyl or pinanyl radical. These compounds are now easily accessible from the corresponding alcohols or hydrocarbons (see, for example, "Organic Peroxides" by A. G. Davies).

It is not necessary to use a 100% pure hydroperoxide. The reaction is possible with dilute solutions of hydroperoxide in a convenient solvent. In particular, technical grade dilute solutions of hydroperoxide, obtained by the oxidation of hydrocarbons followed by the elimination of the acid derivatives by any known means, may be used; such solutions may still contain by-products such as esters, alcohols and ketones which do not interfere with the preparation of the organoperoxyborane. For example it is possible to use a dilute solution of cyclohexyl hydroperoxide obtained by oxidation of cyclohexane with air and simply freed of the acid derivatives produced during this oxidation.

The alkyl orthoborates used are those of Formula II in which R' is preferably an alkyl radical of 1 to 4 carbon atoms having a straight or branched chain. Methyl orthoborate, which is an easily obtainable commercial product, is most preferred; ethyl orthoborate may also be used with advantage.

It is to be understood that the process of the invention is not limited to reactions between a specific organic hydroperoxide and a specific alkyl orthoborate. It is thus possible to react a mixture of the above hydroperoxides with one or more of the above orthoborates. However, generally reactions between a definite compound of each category is of greater interest.

From the above reaction scheme it is theoretically sufficient for the molar ratio of orthoborates to hydroperoxide to be equal to 1:3. In practice this ratio may vary between rather wide limits, depending on whether a solvent is or is not used to dilute the reagents. If the reaction is carried out without a solvent it is necessary to work with an excess of orthoborate. In practice it is preferable for this excess to be large, generally so that the above ratio is at least equal to 5:1. Usually, a ratio greater than 25:1 is of little interest. The use of a liquid solvent allows the proportion of alkyl orthoborate used to be considerably reduced. Though the reaction can, under these conditions, be carried out with the stoichiometric amounts of hydroperoxide and orthoborate, it is advantageous to use an excess of alkyl orthoborate. Amounts of orthoborate such that the ratio orthoborate:hydroperoxide has values between 0.4:1 and 2:1 are generally suitable.

Only such liquids which give no recation, or substantially no reaction with the reactants or products over the temperature range in which the reaction is carried out should be used. For example, it is possible to use aliphatic and alicyclic saturated hydrocarbons and aromatic hydrocarbons, which may, inter alia, carry substituents such as halogen atoms, e.g. chlorine or fluorine.

Together with the tri(organoperoxy)borane the reaction produces an alcohol which is preferably removed from the reaction medium at the rate at which it is formed. This removal, which generally consists of a simple distillation under the working conditions, is the easier the greater the difference between the boiling point of the alcohol and that of the hydroperoxide used. Preferably solvents are used which allow the alcohol liberated to be eliminated from the reaction mixture otherwise the unreacted alkyl borate has to be removed from the alcohol which forms a binary mixture with it. This may be achieved, for example, if the solvent chosen has a higher boiling point than the alcohol. Especially preferred solvents are those which form with the alcohol a binary azeotrope which may be removed by simple distillation under the reaction conditions; the use of such solvents is particularly advantageous where the alkyl orthoborate used is methyl orthoborate or ethyl orthoborate because it is then possible to remove, at atmospheric pressure, a binary azetrope of solvent and alcohol which is more volatile than the binary azeotrope of orthoborate and alcohol.

When methyl orthoborate is used, the following may be advantageously used as the solvent: 1-chloropropane, 2-chlorobutane, 1-chloro-2-methylpropane, 2-chloro-2-methylpropane, cyclohexane, methylcyclopentane, 2,3-dimethylbutane, and hexane. When ethyl orthoborate is used the following solvents, for example, may be used: 2,2-dichloropropane, 1-chlorobutane, 2-chlorobutane, benzene, cyclohexane, methylcyclopentane, 2,3-dimethylbutane, methylcyclohexane, hexane and heptane.

The use of a solvent furthermore makes it possible directly to obtain solutions of the tri(organoperoxy)boranes which, for certain applications, may be used without further treatment.

The amount of solvent varies according to the nature and quantity of the orthoborate employed. As a general rule it is preferable for the concentration, by weight, of the hydroperoxide in the mixture (hydroperoxide+orthoborate+solvent) to be less than 25%. Amounts of solvent which ensure that this concentration has values of between 3% and 20% are generally suitable.

The reaction temperature used depends on the stability of the hydroperoxide and the nature of the orthoborate used. It is always desirable that the temperature should be as low as possible so as to avoid decomposing any of the hydroperoxide used and of the peroxyborane formed, the stability of the latter being generally less than that of the corresponding hydroperoxide. Temperatures above 90° C. are not suitable.

The reaction may be carried out at atmospheric pressure, but when the reaction mixture has a boiling point above 90° C., at this presure, it is necessary to use a sub-atmospheric pressure so as to lower the boiling point.

A typical mode of working is as follows: After having replaced the air in the apparatus by an inert gas (nitrogen or argon) the mixture of hydroperoxide, orthoborate and, optionally, solvent is heated to a temperature not greater than 90° C. and a pressure is provided such that the alcohol can be removed at the rate at which it is formed. When methyl orthoborate or ethyl orthoborate is used, the choice of suitable binary azeotropes makes it possible to work at atmospheric pressure. Subsequently the greater part of any excess orthoborate and, where appropriate, the solvent may be recovered by heating the remaining product at progressively decreasing pressures.

The tri(organoperoxy)boranes so obtained are in the form of very viscous liquids. They have the property of combining with certain amines such as pyridine to form complexes which are generally solid and insoluble in saturated hydrocarbons such as pentane and heptane.

The products prepared by the process of the invention may be used for various purposes. They are powerful oxidising agents and in this capacity make it possible to carry out numerous oxidation reactions in organic chemistry for which the use of an alkyl hydroperoxide alone is not satisfactory. For example, phenolic compounds may be produced from aromatic compounds having at least one nuclear hydrogen atom. These compounds may be monocyclic or polycyclic hydrocarbons and may optionally carry non-oxidisable groups such as halogen atoms or ether groups. For this oxidation it is preferable to use tri(cyclohexylperoxy)borane as it is easily obtainable from cyclohexyl hydroperoxide.

The working conditions and the proportions used depend on the aromatic compound to be oxidised, and the peroxyborane used. In general terms, the reaction temperature depends on the decomposition temperature of the peroxyborane and on the oxidisability of the aromatic compound. It is generally sufficient to heat the mixture for 1 to 10 hours at a temperature of between 50° and 250° C. The reaction, which is carried out in the liquid phase, may take place in an anhydrous medium, optionally in a solvent which is inert under the reaction conditions. To avoid the use of another solvent it is also possible to react the peroxyborane with an excess amount of the aromatic compound, the excess serves as diluent. In this case the molar ratio of the aromatic compound to the peroxyborane is considerably greater than the theoretical ratio of 3:1 which is necessary for carrying out the oxidation; thus a concentration of 1 to 10% of the peroxyborane in the aromatic compound allows the reaction to be carried out advantageously. The reaction ceases when there is no more peroxyborane present in the mixture; the unconverted aromatic compound may be recycled. Hydrolysis of the residue may then be carried out, the phenol being subsequently isolated by washing the organic phase with alkali. It is also possible to subject the residue to an alcoholysis with a volatile alcohol such as methanol or ethanol, the volatile borate being removed at the rate at which it is formed, with the phenol then being separated from the residual product by conventional means such as distillation or solvent extraction.

The following examples illustrate the invention: Examples 1 to 11 illustrate the preparation of the peroxyboranes and Examples 12 to 15 illustrate their use as oxidising agents.

EXAMPLE 1

The apparatus used consisted of a 500 cc. flask fitted with a nitrogen inlet, a thermometer sleeve, a distillation column and an analyser, a downward-sloping condenser and a receiver linked to a bubble counter via a drying column.

The apparatus was carefully purged with nitrogen and then 30 g. of cyclohexyl hydroperoxide (97% purity) and 185 g. of methyl borate were introduced into the flask. The mixture was then slowly heated to boiling, which started when the temperature of the mixture reached 71° C.

At this temperature the methanol distilled off as soon as it formed as a binary azeotrope of methanol and methyl borate (boiling point 55° C.) which contained 32% of methanol. After 30 minutes the temperature of the vapours which distilled remained constant at 56–57° C. the distillation was continued until it yielded pure methyl borate (boiling point 68° C.). The temperature of the reaction mixture was then 82° C. The mixture was allowed to cool to ambient temperature and then the distillation of the excess methyl borate was continued at 15 mm. Hg pressure and finally for a further 30 minutes at 40° C./0.5 mm. Hg. This left 31.7 g. of a colourless liquid of low mobility which had a boron content of 3.3% [calculated for $B(OOC_6H_{11})_3$: 3.09%]. Analysis of this liquid by infra-red sprectrography (I/R) and nuclear magnetic resonance (NMR) showed that the structure of the principal constituent was certainly that of tri(cyclohexylperoxy)borane. By determining the reactive oxygen present it was found that the final product contained 82.5% of tri(cyclohexylperoxy)borane. The loss of reactive oxygen during the operation was 11.8% (taking into account the purity of the hydroperoxide starting material).

EXAMPLE 2

The process was carried out as in Example 1 replacing the cyclohexyl hydroperoxide by 35.2 g. of pure cumyl hydroperoxide. The distillation of the methyl borate/methanol azeotrope formed in the reaction took about 1 hour, the distillation was then continued until the temperature of the reaction mixture reached 75° C. The distillation was completed in vacuo as described in the preceding example, leaving 38.2 g. of a colourless liquid of low mobility. The principal constituent of this liquid 87.8% according to the reactive oxygen determination) was identified by I/R and NMR spectrography as tri(1-phenyl-1-methylethylperoxy)borane. 7% of the reactive oxygen was lost in the course of the process.

EXAMPLE 3

9.2 g. of benzyl hydroperoxide (purity 91.5%) and 65 g. of methyl borate were introduced into an apparatus similar to that described in Example 1 but with a 250 cc. flask. Using the procedure of Example 1, 9.6 g. of a thick clear yellow liquid containing, according to the reactive oxygen determination, 70% of a product identified as tri(benzylperoxy)borane was obtained.

EXAMPLE 4

The process was carried out as in the preceding example using 4.6 g. of methylcyclohexyl hydroperoxide (purity 90%) and 82 g. of methyl borate. 5.2 g. of a clear viscous liquid containing 80.5% of a product identified by infrared and NMR spectrography as being tri(methylcyclohexylperoxy)borane was obtained. The loss of reactive oxygen in the course of the process was about 5.5%.

EXAMPLE 5

The same apparatus as in Example 3 was used. 5.15 g. of cyclohexyl hydroperoxide (90.5% pure) and 130 g. of ethyl borate were introduced into the reaction flask. A reduced pressure (150 mm. Hg) was then gradually established in the apparatus and the mixture was heated to 73° C., at which temperature boiling started. Distillation was carried out for one hour at this pressure, then at 15 mm. Hg for 30 minutes; the removal of the excess ethyl borate was completed as in the preceding examples. 6.45 g. of a clear viscous liquid containing 70% (according to reactive oxygen determination) of a product identified as being tri(cyclohexylperoxy)borane were obtained.

EXAMPLE 6

The process was carried out as in Example 5 using 5 g. of cyclohexyl hydroperoxide (89.6% pure) and 125 g. of isopropyl borate. The pressure in the apparatus was reduced to 70 mm. Hg and the mixture heated up to the point at which boiling started (about 75° C.). The distillation was carried out for one hour at this pressure followed by 30 minutes at a pressure of 2.5 mm. Hg. The process was completed as in the preceding example to give 5.9 g. of a clear liquid containing 72.5% of tri(cyclohexylperoxy)borane.

EXAMPLE 7

The process was carried out as in Example 6, using 5 g. of cumyl hydroperoxide (97.5% pure) and 125 g. of propyl orthoborate. The pressure in the apparatus was reduced to 11 mm. Hg and the mixture heated to about 77° C., at which temperature boiling started. The distillation was carried out for one hour under these conditions after which the residual propyl orthoborate was removed at 50° C. and 0.5 mm. Hg over 45 minutes. 16.9 g. of a mixture containing 68% of propyl orthoborate and 29% of tri(1-phenyl-1-methylethylperoxy)borane were obtained. There was no loss of reactive oxygen during the process.

EXAMPLE 8

The apparatus used consisted of a one litre flask equipped as in Example 1. This apparatus was carefully purged with nitrogen and 52.5 g. of cyclohexyl hydroperoxide (purity 95%), 442 g. of anhydrous cyclohexane and 66 g. of methyl orthoborate were introduced into the flask. The mixture was then progressively heated to boiling, which started at 75° C.

The methanol was distilled as soon as it formed, as a mixture of two binary azeotropes, namely methanol and cyclohexane (boiling point 54° C.), and methanol and methyl orthoborate (boiling point 55° C.) and the distillation was continued until pure cyclohexane (boiling point 80° C.) appeared. The mixture was allowed to return to ambient temperature and the cyclohexane removed first at a pressure of 15 mm. Hg and then at 30° C./2 mm. Hg for 30 minutes. 57.5 g. of a colourless liquid of low mobility having a boron content of 3.3% were left. Analysis of this liquid by I/R and NMR spectrography showed that the structure of the principal constituent was definitely that of tri(cyclohexylperoxy)borane. According to a reactive oxygen determination the final product contained 83.2% of tri(cyclohexylperoxy)borane.

EXAMPLE 9

The process was carried out as in the preceding example, using 15.8 g. of cyclohexyl hydroperoxide (90.2% purity), 13.1 g. of methyl orthoborate, and 135 g. of hexane. The mixture was boiled and the methanol was removed as a binary azeotrope of hexane and methanol (boiling point 50° C.) After the excess solvent and methyl orthoborate had been removed at reduced pressure (12 mm., and then 1 mm./Hg) 16.4 g. of a clear viscous oil containing 78.6% of tri(cyclohexylperoxy)borane remained.

EXAMPLE 10

15.8 g. of cyclohexyl hydroperoxide (purity 95%), 135 g. of anhydrous cyclohexane and 10 g. of ethyl orthoborate were introduced into a 500 cc. flask equipped as in Example 1.

The mixture was slowly heated to boiling, which started at 60° C. and then the ethanol was slowly distilled as it formed as a binary azeotrope of cyclohexane and ethanol (boiling point 65° C.). The distillation was continued until pure cyclohexane was obtained. The final mixture was then treated as in Example 1 to give 19 g. of a clear liquid containing 76.3% of tri(cyclohexylperoxy)borane. The loss of reactive oxygen in the course of the process was 5.5% (taking into account the purity of the initial hydroperoxide).

EXAMPLE 11

The apparatus consisted of a 10 litre glass vessel equipped as in Example 1.

3270 g. of a cyclohexane solution containing, by weight, 8.87% of cyclohexyl hydroperoxide and 3.5% of by-products consisting principally of cyclohexanol, cyclohexanone and esters were introduced into the flask. (This solution was obtained by the oxidation of cyclohexane in air until a degree of oxidation of about 4% was achieved, followed by concentration and by washing with an aqueous sodium bicarbonate solution.)

2530 g. of cyclohexane and 730 g. of ethyl orthoborate were then added, and the reaction carried out as in the preceding example. The final mixture (5890 g.) in which 288 g. (i.e. 4.89% by weight) of tri(cyclohexylperoxy)borane were found to be present, was then immediately distilled by progressively feeding into a zone heated to 78° C. under reduced pressure (20 mm. Hg). The vapourised fraction collected after condensation (5330 g.) contained 30.3 g. of unreacted cyclohexyl hydroperoxide. In addition 558 g. of unvapourised products containing 251 g. of tri(cyclohexylperoxy)borane, cyclohexyl orthoborate, cyclohexanone and various esters arising from the starting solution were collected. The loss of reactive oxygen was about 5.2% (taking into account the unreacted cyclohexyl hydroperoxide).

EXAMPLE 12

A 500 cc. flask fitted with a central stirrer unit, a vertical condenser and a nitrogen inlet was charged with 4.5 g. of tri(cyclohexylperoxy)borane of 80% purity, and 193 g. of phenetole. The mixture was heated for 3 hours at 100° C. After cooling to 70° C. 50 cc. of water were added and the mixture was maintained at thit temperature for 30 minutes. The mixture was decanted and the aqueous layer extracted 3 times with 50 cc. of diethyl ether. The ether layers were combined with the decanted organic layer and the mixture extracted 5 times with 50 cc. of a 10% aqueous sodium hydroxide solution. This aqueous solution was acidified by adding 165 cc. of 6 N hydrochloric acid solution and the phenols extracted from it 5 times with 100 cc. of diethyl ether. After washing the ethereal solution was a 10% aqueous sodium bicarbonate solution evaporating the solvent and drying, 3.13 g. of a mixture of ortho and para ethoxyphenols were isolated. The yield as determined iodometrically was 75% based on the reactive oxygen employed.

EXAMPLE 13

3.5 g. of tri(cyclohexylperoxy)borane of 85.4% purity and 150 g. of anisole were reacted as in the previous example. The mixture was heated for 3½ hours at 105–110° C. 2.64 g. of a mixture of ortho and para methoxyphenols were obtained. Yield: 85% based on the reactive oxygen employed.

EXAMPLE 14

10 g. of tri(cyclohexylperoxy)borane of 79% purity and 465 cc. of anhydrous toluene were charged into an apparatus similar to that used in Example 12 using a 1 litre flask. The mixture was heated for 6.25 hours under reflux and then cooled and hydrolysed as in Example 12. Using the separation treatment employed in Example 12, 3.67 g. of a mixture of ortho and para cresols were obtained. Yield: 52% based on the reactive oxygen employed.

EXAMPLE 15

27.5 g. of tri(cyclohexylperoxy)borane of 55% purity (the perdominant by-products being cyclohexyl orthoborate and cyclohexanone) and 730 g. of anisole were charged into the apparatus used in the preceding example. The mixture was heated under a nitrogen atmosphere for 3 hours at 110° C. After cooling, 682 g. of anisole were removed under reduced pressure (30 mm. of mercury), and 200 cc. of methanol were added to the residue; the mixture was heated to boiling point and methyl orthoborate was removed as it formed as a binary azeotrope with methanol (boiling point 55° C.). The excess methanol was removed, the phenolic composition was extracted with caustic soda and then separated as in Example 12. This gave 9.5 g. of a mixture of ortho and para methoxyphenol. The yield was 60% based on the reactive oxygen employed.

We claim:
1. Process for the preparation of phenolic compounds which comprises oxidising a substituted or unsubstituted aromatic hydrocarbon compound having at least one nuclear hydrogen atom wherein the substituents on the substituted aromatic hydrocarbon are selected from the group consisting of halogen, methyl methoxy and ethoxy with a tri(organoperoxy)borane of the formula $B(O-O-R)_3$ in which R is a primary, secondary or tertiary aliphatic or alicyclic hydrocarbon radical of at least four carbon atoms or an araliphatic hydrocarbon radical, hydrolyzing the reaction mixture and recovering the phenol product.

2. Process according to claim 1 in which the aromatic compound is anisole, phenetole or toluene.

References Cited

UNITED STATES PATENTS 3,387,018　6/1968　Parts _____ 260—462

FOREIGN PATENTS 1,458,153　10/1966　France _____ 260—462
1,458,613　10/1966　France _____ 260—462

BERNARD HELFIN, Primary Examiner

U.S. C. X.R.

260—462, 621, 623, 639